July 22, 1969 W. J. ZAHN 3,456,408
SEALING ASSEMBLY FOR PANELS
Filed Sept. 14, 1967 2 Sheets-Sheet 1
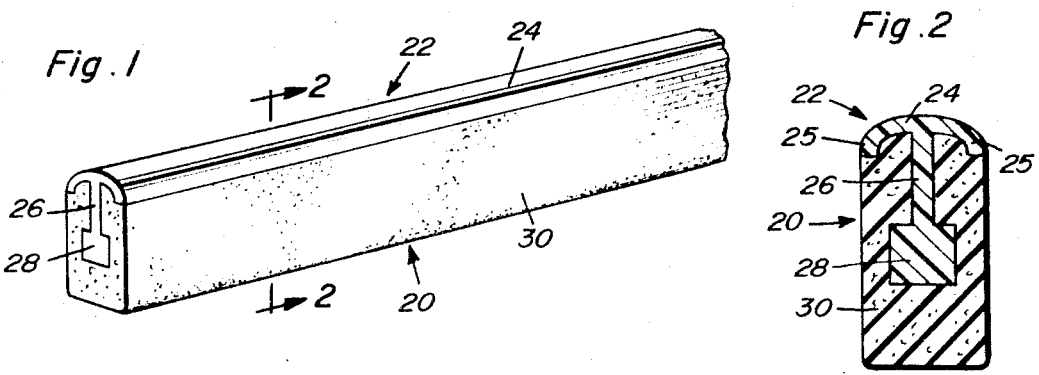
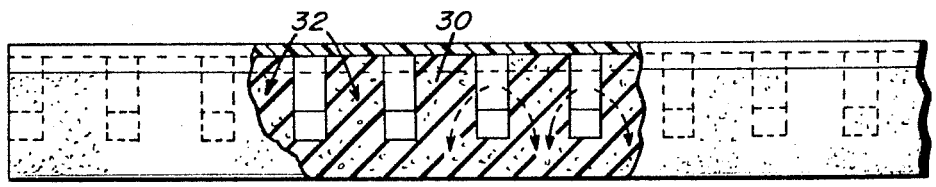
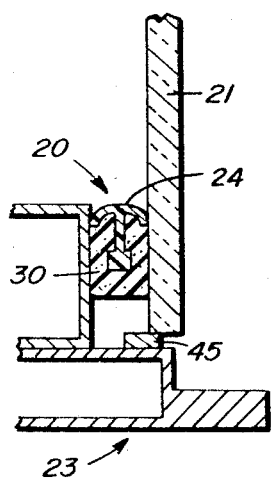
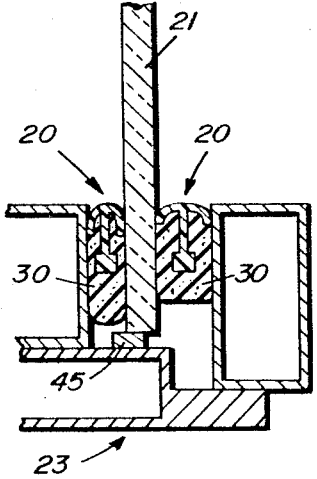
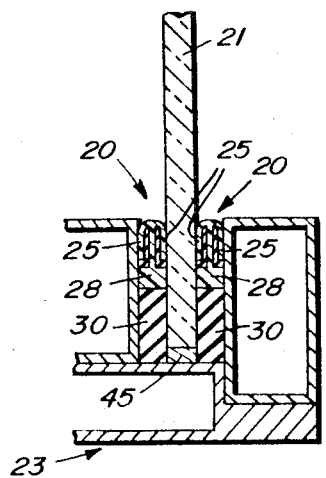
Walter J. Zahn
INVENTOR.
BY Clarence A. O'Brien
and Harvey B. Jacobson
Attorneys July 22, 1969   W. J. ZAHN   3,456,408
SEALING ASSEMBLY FOR PANELS
Filed Sept. 14, 1967   2 Sheets-Sheet 2
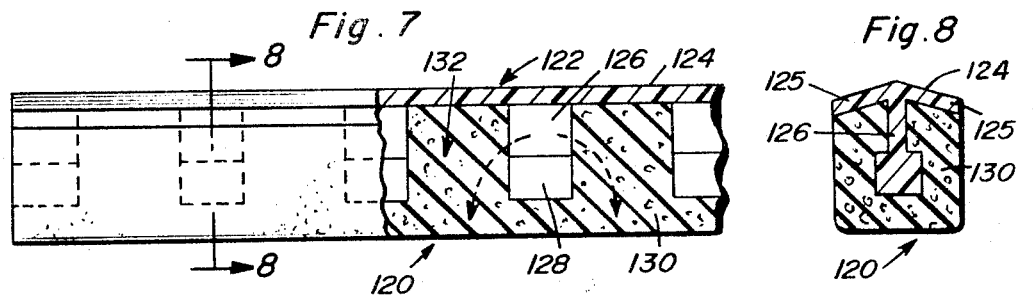
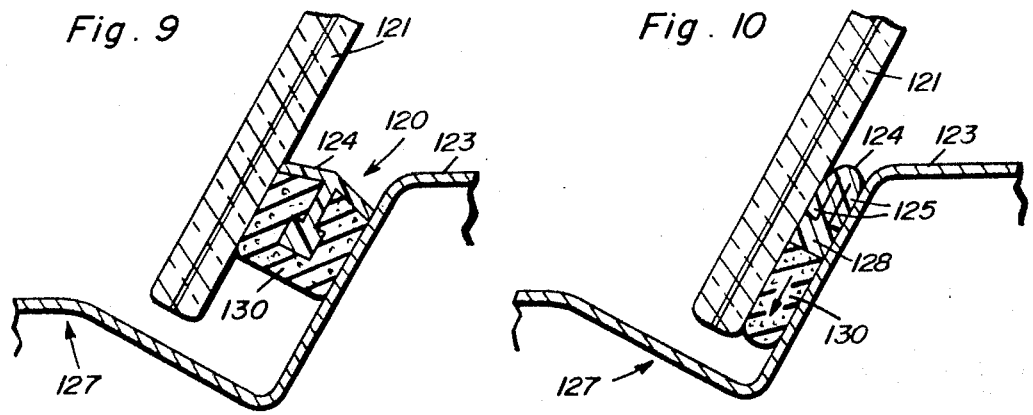
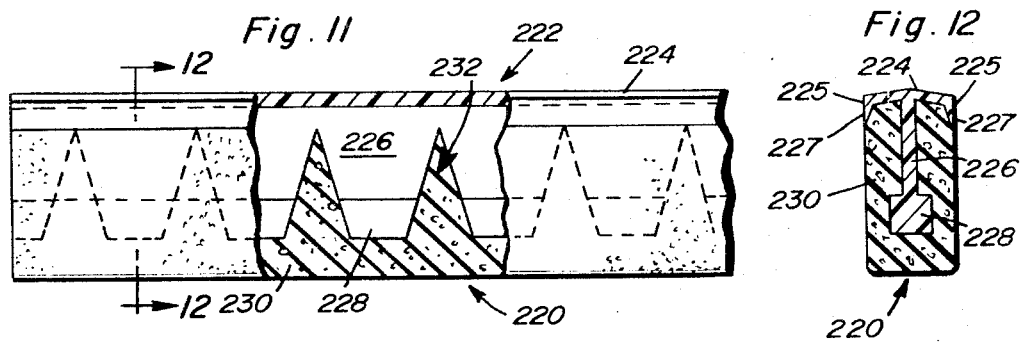
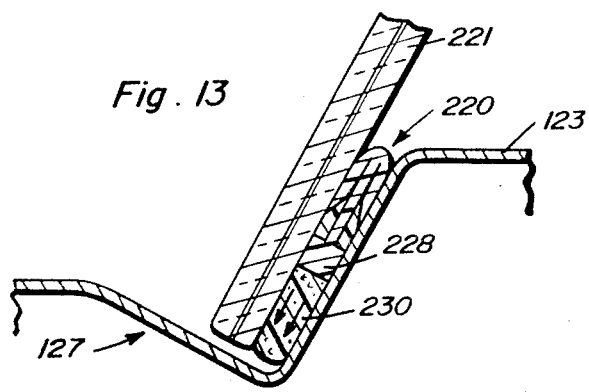
Walter J. Zahn
INVENTOR.

United States Patent Office 3,456,408
Patented July 22, 1969

1

3,456,408
SEALING ASSEMBLY FOR PANELS
Walter J. Zahn, Evansville, Ind., assignor to Uniseal, Inc., a corporation of Michigan
Filed Sept. 14, 1967, Ser. No. 667,784
Int. Cl. E06b *3/62;* E04b *1/62;* E04f *15/14*
U.S. Cl. 52—208                    10 Claims

ABSTRACT OF THE DISCLOSURE

An elongated continuous panel joint sealant retaining tack-free extruded backbone adapted to be utilized in conjunction with a tacky elastomeric sealing composition such as conventionally interposed between a panel and a supporting frame to effect a water, dust and air-tight seal between the panel and frame. The extruded backbone primarily provides a sealant composition retaining dam to prevent the tacky sealant composition from oozing out from between the panel and frame whereby a highly undesirable unsightly dust catching condition would be created. The sealant retaining strip preferably includes an anchor means integral and generally co-extensive with the dam to preclude undue shifting of the dam under panel-to-frame assembly or service pressures thereby assisting the dam in retaining the tacky sealant composition in proper relation between the panel and the supporting frame.

---

The present invention relates to a sealing assembly for panels adapted to assist in establishing and maintaining a peripheral seal between a panel and a supporting frame for the panel. More particularly, the present invention relates to flexible sealing assembly for the peripheral sealing of a panel to a supporting frame wherein a tacky elastomeric sealant composition or mastic is conventionally interposed between the panel and the frame. More specificially, the present invention relates to a sealing assembly for panels which is primarily adapted to preclude the oozing of tacky mastic from within a joint between a panel and a supporting frame for the panel.

One of the problems presented to automobile manufacturers is the oozing out of tacky sealing compositions placed between the windshield and windshield receiving frame during warm weather so as to directly contact the frame and which oozing fastic often times exudes into the passenger compartment whereby an unsightly dust-catching condition is created. In addition, in the building trades, and particularly in conjunction with the construction of curtain walls wherein panels are sealingly mounted within supporting frames, a problem analogous to that set forth with regard to the placement of automobile windshields also exists, inasmuch as a bead of tacky elastomeric sealant is conventionally interposed between the panel, which may comprise a transparent, translucent or opaque member, and a supporting frame for the panel to provide a water, dust and air seal between the panel and the frame.

It is an object of the present invention to provide a sealing assembly for establishing an improved seal between a panel and a supporting frame for the panel wherein a tacky elastomeric sealant composition is normally interposed between the panel and the frame.

Another object of the present invention is to provide a peripheral sealing assembly for panels including an elongated continuous panel-to-frame joint sealant retaining strip adapted to retain a tacky elastomeric sealant composition within the panel-to-frame joint whereby a highly undesirable unsightly dust-catching condition would be prevented.

A further object of the present invention is to provide a sealing assembly for panels including a generally continuous dam element to prevent a tacky elastomeric seal-

2 ant composition from ooznig out from within a panel-to-frame joint under assembly or service pressures.

Still another object of the present invention is to provide a sealing assembly for panels of the aforementioned construction which preferably includes an anchor means integral with, and generally coextensive with, the aforementioned dam to preclude undue shifting of the dam relative to the panel or frame under normal panel-to-frame assembly or service pressures thereby assisting the dam in retaining the tacky sealant composition in proper sealing relation between the panel and its supporting frame.

Still another object of the present invention is to provide a sealing assembly provided with mastic dam and dam anchor means which includes a panel-to-frame spacer or compression limiting means generally carried by the anchor means to prevent all of the tacky sealant from being exuded from between the panel and the frame as a result of service pressures.

Still a further object of the present invention is to provide a sealing assembly for retaining tacky elastomeric sealant in panel-to-frame joints wherein the anchor means may be notched in a regular pattern or at pre-arranged points in order to allow the assembly to bend or flex around corners or radii of the peripheral edge of the panel without deforming the sealant damming member of the assembly to the extent where it would no longer be capable of precluding the oozing of the sealant composition from within the panel-to-frame joint.

A still further object of the present invention is to provide a sealing assembly for panels, such as automotive windshields and large panes of glass in curtain wall construction, whereby the sealing assembly comprises a generally T-shaped flexible synthetic plastic, synthetic rubber, etc., member provided with co-extensive bead of tacky elastomeric sealant composition molded to the leg or base portion of the T-shaped extrusion to facilitate the establishment of sealed panel-to-frame joints.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of an exemplary embodiment of a sealing assembly for panels constructed in accordance with the present invention and primarily, although not necessarily, adapted for the establishment of an improved glass curtain wall panel-to-frame joint;

FIGURE 2 is an enlarged transverse, cross-sectional view taken substantially along the plane of the line 2—2 of FIGURE 1;

FIGURE 3 is an enlarged side elevational view of the sealing assembly of FIGURE 1 with portions thereof illustrated in longitudinally vertical cross-section;

FIGURES 4, 5 and 6 comprise sequential vertical cross-sectional views illustrating an exemplary mode of utilizing the sealing assembly of FIGURE 1 for the establishment of a panel-to-frame seal between a glass panel in a curtain wall and its supporting frame;

FIGURE 7 is a fragmentary side elevational view of another exemplary embodiment of a sealing assembly for panels constructed in accordance with the invention with portions of the sealing assembly shown in longitudinal vertical cross-section;

FIGURE 8 is a transverse vertical cross-sectional view taken substantially along the plane of line 8—8 of FIGURE 7;

FIGURES 9 and 10 are somewhat sequential vertical cross-sectional views illustrating an exemplary mode of utilizing the sealing assembly of FIGURE 7 to effect a seal between an automotive glass panel and the automotive body carried suporting frame therefor.

FIGURE 11 is a fragmentary side elevational view of still another embodiment of a sealing assembly for panels constructed in accordance with the invention with portions of the sealing assembly illustrated in longitudinal vertical cross-section;

FIGURE 12 is a transverse vertical cross-sectional view of the sealing asembly of FIGURE 11 taken substantially along the plane of the line 12—12 of FIGURE 11; and FIGURE 13 is a vertical cross-sectional view illustrating the assembled relation of the exemplary sealing assembly of FIGURE 11 in the placement of a glass panel relative to an automotive body carried frame.

Referring to the drawings in greater detail and FIGURES 1-6 in particular it will be seen that an exemplary sealing assembly for panels indicated generally at 20 therein comprises an elongated panel-to-frame joint sealant retaining strip means 22 including a dam member 24 and referably an anchor means 26 integral therewith. In addition, the sealant retaining strip 22 may include a panel-frame spacer means 28 normally integral with the anchor means 26 on the end thereof distal to its attachment to the dam member 24. For the purpose of rendering the utilization of the sealant retaining strip 22 more convenient the sealing assembly 20 should further include a generally coextensive partially encompassing bead of a tacky elastomeric mastic or sealing composition 30 such as conventionally utilized for the sealing of joints between panels, such as glass panels for example, and their supporting frames. Exemplary suitable plastic composition comprise those normally referred to as polybutene sealing composition, for example. Accordingly, it will be seen that the tack-free extruded backbone, or sealant retaining strip 22 preferably, although not necessarily comprises an elongated member having a generally T-shaped cross-section configuration, wherein the dam member 24 forms the arms of the T and the anchor means 26 the leg of the T with the spacer means 28 depending therefrom. As seen best in FIGURE 3 the dam member 24 is generally continuous, other than at the site of a mechanical splice. However, the anchor means 26 may be notched as at 32 in a regular pattern as shown, or at predetermined points in order to allow the sealant retaining strip 22 to bend or flex around corners or radii of a panel without unduly deforming the dam member 24 to the extent where it would no longer function to retain the mastic 30. The primary function of the anchor means 26, which in the relaxed position of the sealant retaining strip 22 as shown in FIGURE 1, is generally normal to the dam or arm portion 24 is to prevent undue shifting of the sealant retaining strip 22 and more specifically the dam member 24 under assembly or service pressures inasmuch as such undue shifting of the strip 22 would normally create a highly undesirable condition due to the exuding of mastic 30 past the dam member 24.

If a panel-frame spacer means 28 is utilized, as shown, although it will be understood that utilization of the panel-frame spacer means 28 is not essential but merely preferred, the spacer means 28 will normally be notched to the same extent as the anchor means 26 of which it is an integral part. The spacer block i.e. space means 28 is a means of limiting the amount of mastic 30 that can be squeezed out from within a panel-to-frame joint, as will become more apparent thereinafter during discussion of the utilization of the sealing assembly 20, as a result of pressures generated during assembly of a panel relative to a joint when utilizing the sealing assembly 20 or service pressures exerted on the sealing assembly 20 due to expansion, contraction, distortion of the frame, vibration, wind, etc. Therefore, it will be appreciated that the spacer rod 28 precludes the exuding of all of the mastic 30 from the area between the underside of the dam member 24 and the upper edge of the spacer block 28 downwardly past the spacer block 28 as the generally downwardly formed or bent arms of the dam member 24 are deflected downwardly and inwardly toward the anchor means 26 under the influence of such assembly or service pressures, thereby maintaining a better seal between a panel and its associated frame in the area between inwardly folded arms of the dam member 24 and the spacer block 28. The flowing of mastic 30 from the above described areas is graphically illustrated by the phantom line arrows shown in FIGURE 3, for example and whereby the lateral pressures resulting from the movement of the mastic further urge the dam member against the panel and supporting frame. Accordingly, it will be appreciated that when utilizing the spacer means 28 for the reasons set forth above or to help cushion the glass to minimize the chance that the glass panel will break, the notching, i.e. removal of some of the spacer means 28 to allow the relatively easy and downward exuding of excess mastic past the spacer block, should be sufficient for the installation contemplated.

In addition, although not specifically set forth heretofore, it will be appreciated that a significant feature of the invention resides in the fact that the arms of the T, i.e. the arms comprising the dam 24 are preferably, although not necessarily, shaped, in a normally relaxed position, to incline downwardly toward the anchor means 26. However, the arms 25 could extend normally or upwardly relative to the anchor 26 as long as the arms 25 are capable of retaining the sealant composition. It will be understood that the arms 25 of the dam member 24 preferably although not necessarily depend arcuately downwardly, or are canted downwardly or bent downwardly in use to substantially insure the downward and inward deformation of the arms 25 under the influence of lateral pressure. Thus, it will be appreciated that if the spacer block 28 were an elongated continuous block, such as in the fashion of the dam member 24, and lateral pressure were to be applied mainly between the edge of the arms 25 and the spacer block 28 there would be a "trapped" portion of mastic 30 as the sealing assembly 20 is compressed under the influence of laterally opposed forces. If such were the case, there would be the possibility that pressure would tend to force the arms 24 upwardly and inwardly away from the anchor means 26 permitting excess mastic to ooze past the dam member 24. Thus, as indicated hereinbefore, the notching of the block 28 and the anchor 26 permit excess mastic to exude downwardly without exerting undue deforming pressure on the arms 25 thereby maintaining the integrity of the seal established by the seal assembly 20.

Referring now in greater detail to FIGURES 7-10 it will be seen that an embodiment 120 of a sealing assembly constructed in accordance with the invention comprises analogous means and element sto those illustrated and enumerated with regard to the embodiment of FIGURE 1 and accordingly it will be seen that the embodiment of FIGURE 7 includes a sealant retaining strip 122, dam member 124, arms 125, anchor means 126, panel-frame spacer block means 128, and coextensively extruded partially encircling bead 130 of tacky elastomeric sealing composition. From a simultaneous consideration of FIGURES 3 and 7 as well as FIGURES 2 and 8 it will be appreciated that the structural distinctions between the embodiment of FIGURE 1 and that of FIGURE 7 reside in the distribution of the notching of the anchor 126 and spacer block 128 as indicated at 132 and the downwardly and inwardly converging generally planar arms 125 of the dam member 124.

Referring now to FIGURES 11-13 and an exemplary embodiment 220 of a sealing assembly constructed in accordance with the invention illustrated therein it will be seen that the embodiment 220 includes means and elements analogous to those illustrated and enumerated with regard to the assemblies of FIGURES 1 and 7 and thus it will be seen that the embodiment 220 includes sealant retaining strip 222, dam member 224, arms 225, somewhat analogous to the generally planar downwardly inclined arms 125 and further including pronounced downwardly extending lips 227. The embodiment 220 further includes anchor means 226, panel frame spacer means 228 and tacky elastomeric sealant composition 230. From a simultaneous reconsideration of FIGURES 3, 7 and 11 it will be appreciated that the embodiment of the sealing assembly 220 differs primarily in the mode of notching of the anchor means 226 and spacer means 228 as indicated at 232, wherein the aforementioned means are triangularly notched, and the provision of the additional sealing lips 227.

Referring now to the utilization of the sealing assemblies 20, 120 and 220 to effect a sealed panel-to-frame joint, and first referring more particularly to the assembly 20 of FIGURES 1–3, the utilization of which is schematically and sequentially illustrated in FIGURES 4–6, it will be seen that a plurality of the assemblies 20 are being utilized in the embodiment of a sealed glass panel 21 to curtain wall panel frame joint wherein the several curtain wall frame elements are indicated generally at 23. Thus, in FIGURE 4 it will be seen that the glass panel 21 is partially resting on a resilient spacer block 45 and a length of the sealing assembly 20, coextensive with the length and/or perimeter of the glass panel 21 is interposed between the glass panel 21 and an element of the frame 23 and wherein the dam member 24 of the sealant retaining strip 22 is disposed toward the exterior, or normally observable, portion of the frame 23. In FIGURE 5, it will be seen that the peripheral surface of the glass panel 21 opposite that previously provided with the sealing assembly 20 is likewise provided with a second coextensive length of sealing assembly 20 and a compression molding comprising a portion of the frame 23 is being urged toward the assembled relation relative to the other elements of the frame 23 and wherein the glass panel 21 is beginning to be urged into contiguous relation with the spacer block 45 and wherein the sealing assemblies 20 are illustrated in two different intermediate stages of compression and downward, non-leaking, displacement of the tacky mastic 30. In the sequential view in FIGURE 6 it will be seen that the several components of the frame 23 have been compressed into their normally assembled relationship and secured therein by suitable fasteners, not shown, and the glass panel 21 is now contiguous with the spacer block 45 and the panel-to-frame distance has approximately reached the minimum possible by virtue of the interposed spacer block 28 and wherein it will be further observed that the arms 25 have deflected downwardly toward the anchor 26 thus establishing a highly desired, water, dust and air tight seal between the glass panel 21 and the components of the frame 23. Furthermore, it will be seen that the excess mastic 30 has been displaced downwardly to fully seal and cushion the lower edge of the glass panel 21.

Referring now to the utilization of the sealing assemblies 120 and 220 in conjunction with the placement of automotive windshields 121 and 221, respectively, as seen best in FIGURES 9, 10 and 13, in the aforementioned figures it will be seen that a fragmentary portion 123 of the auto body is illustrated in the exemplary deformed configuration wherein a windshield receiving frame, indicated generally at 127, is established. In FIGURE 9 it will be seen that a length of sealing assembly 120 is shown in the substantially uncompressed condition interposed between the inner lower surface of the windshield 120 and wherein the dam member 124 is disposed toward the interior of the passenger compartment whereby as best seen in FIGURE 10 wherein the windshield 121 is in its fully compressed assembled relation relative to the body portion 123 the arms 125 of the dam member 124 have been deflected downwardly and inwardly toward the anchor means 126 under the lateral pressure established by the movement of the windshield 121 thereagainst. Further, as graphically illustrated by the full arrow in FIGURE 10 within the mastic 130 it will be seen that surplus mastic 130 is permitted to flow downwardly past the spacer means 128 by the notched out regions 132 so as to complete the windshield 121 to frame 127 joint.

Finally, as seen in FIGURE 13, the windshield panel 221 is illustrated in a fully compressed relation relative to the automobile body member 123 and wherein the sealing assembly 220 is illustrated in its full compressed positioned wherein further movement of the windshield panel 221 relative to the automotive portion 123 is limited by the spacer block 228. As with FIGURE 10, FIGURE 13 as may be seen by the full line arrow within the mastic 230 graphically illustrates the flow of excess mastic 230 from the area above the spacer block 228 to the area below the spacer block 228 defined between the inner surface of the windshield panel 221 and the outer surface of the automotive body member 123. Thus, as with the previously described figures illustrating the utilization of the sealing assemblies constructed in accordance with the invention the sealing assembly 220 effectively establishes a non-dust attracting panel-to-frame joint seal.

While the sealing assemblies 20, 120 and 220 have been illustrated as including spacer means 28, 128 and 228 respectively and notches 32, 132 and 232 respectively as well as mastic beads 30, 130 and 230 respectively it will be appreciated that these respective means are optional so that the carrying forth of the present invention is primarily predicated upon the coaction of the dam members 24, 124 and 224 together with their respective integral anchor members 26, 126 and 226. Although not specifically indicated heretofore it will nevertheless be understood that the sealant retaining strips 22, 122 and 222 may be formed of suitable flexible and/or resilient synthetic plastics, vulcanized natural rubber, and synthetic rubbers such as neoprene, silicone rubber, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted, to falling within the scope of the invention as claimed.

What is claimed as new is as follows:

1. In combination with a panel and an adjacent generally spaced panel supporting frame provided with a generally tacky generally flowable sealant interposed between the panel and the frame to effect a seal therebetween, a sealant retaining strip means of flexible material having a longitudinally, laterally and generally arcuately downwardly extending sealant retaining dam means, said dam means having a transverse dimension providing a sealing bridge across the space defined between the panel and the adjacent supporting frame whereby lateral forces urge the sealant retaining dam against the panel and the frame to generally preclude the exuding of sealant out of the area defined between the panel and the frame, and a generally longitudinally extending achor means integral with and generally depending from said sealant retaining dam whereby said anchor means is normally disposed generally within the flowable sealant to provide a means of anchoring said sealant retaining dam generally against sealant releasing shifting and deformation under the influence of movement of the interposed sealant and panel relative to the frame.

2. The combination of claim 1 wherein said anchor means extending longitudinally along said sealant retaining dam is notched at at least one point along the length thereof and wherein the relieved area defined by said notch generally extends along a major proportion of the axial length of said depending anchor means.

3. The combination of claim 1 wherein said sealing means includes a generally longitudinally extending spacer block means integral with and depending from said anchor means, said spacer block means having a transverse dimension greater than that of a transverse dimension of said anchor means and lesser than said transverse dimension of said sealant retaining dam means prior to compression.

4. The combination of claim 3 wherein said longitudinally extending spacer block means and said anchor means are notched at at least one predetermined point to point to provide at least one relieved area defined by said at least one notch.

5. A sealing means for a joint between a panel and an adjacent but generally spaced panel supporting frame to effect a seal between the panel and the frame comprising a sealant retaining strip means of generally self-sustaining flexible material having a longitudinally extending sealant retaining dam means, said dam means having a transverse dimension providing a sealing bridge across a space defined between a panel and its adjacent supporting frame with which said sealing means is associated, a generally longitudinally extending anchor means integral with and generally depending from said sealant retaining dam means whereby said anchor means is normally disposed generally within the space defined between the panel and panel supporting frame, a longitudinaly extending bead of generally tacky, generally flowable sealant formed in generally encompassing adhered relation to said anchor means, said tacky sealant bead being of sufficient transverse dimension to normally provide an effective seal between a panel and its associated panel supporting frame in their assembled relation, said sealant retaining dam providing means to generally preclude the exuding of sealant out of the area defined between the panel and the panel supporting frame, said anchor means normally disposed generally within said tacky bead of sealant to provide a means of anchoring said sealant retaining dam generally against sealant releasing, shifting and deformation under the influence of movement of the sealant and panel relative to the frame, said sealing means including a generally longitudinally extending spacer block means integral with and depending from said anchor means, said spacer block means having a transverse dimension greater than that of a transverse dimension of said anchor means and lesser than said transverse dimension of said sealant retaining dam means prior to compression, said longitudinally extending spacer block means and said anchor means being notched at at least one predetermined point to provide at least one relieved area defined by said at least one notch.

6. A sealing means for a joint between a panel and an adjacent but generally spaced panel supporting frame to effect a seal between the panel and the frame comprising a sealant retaining strip means of generally self-sustaining flexible material having a longitudinally extending sealant retaining dam means, said dam means having a transverse dimension providing a sealing bridge across a space defined between a panel and its adjacent supporting frame with which said sealing means is associated, a generally longitudinally extending anchor means integral with and generally depending from said sealant retaining dam means whereby said anchor means is normally disposed generally within the space defined between the panel and panel supporting frame, a longitudinally extending bead of generally tacky, generally flowable sealant formed in generally encompassing adhered relation to said anchor means, said tacky sealant bead being of sufficient transverse dimension to normally provide an effective seal between a panel and its associated panel supporting frame in their assembled relation, said sealant retaining dam providing means to generally preclude the exuding of sealant out of the area defined between the panel and the panel supporting frame, said anchor means normally disposed generally within said tacky bead of sealant to provide a means of anchoring said sealant retaining dam generally against sealant releasing, shifting and deformation under the influence of movement of the sealant and panel relative to the frame, said sealant retaining dam means including longitudinally and laterally extending dam arm means, said arm means being adapted to be sealingly deflected generally downwardly and inwardly under the influence of lateral force whereby said dam arm means is maintained in sealing relation to the panel and panel supporting frame under the influence of relative movement of a panel to its supporting frame.

7. The combination of claim 6 wherein said means adapting said dam arm means to be sealingly deflected comprises providing means generally slanting said dam arm means, in their normal generally relaxed position, generally downwardly relative to a longitudinally extending plane generally normal to the surface of at least one member of the panel-frame joint.

8. In combination with an automotive glass panel and an adjacent but generally spaced glass panel supporting frame comprising a portion of an automotive body, a sealing means to effect a seal between the glass panel and the supporting frame comprising a sealant retaining strip means of generally self-supporting flexible material having a longitudinally extending a sealant retaining dam means normally disposed toward a passenger receiving compartment of an automobile, said dam means having a transverse dimension providing a sealing bridge across a space defined between the glass panel and its adjacent supporting frame, a generally longitudinally extending anchor means integral with and generally depending from said sealant retaining dam means whereby said anchor means is normally disposed generally within the space defined between said glass panel and said supporting frame, a longitudinally extending bead of generally tacky, generally flowable sealant formed in generally encompassing adhered relation to said anchor means, said tacky sealant bead being of sufficient transverse dimension to normally provide an effective seal between the glass panel and its associated supporting frame in their assembled relation whereby lateral forces urge the sealant retaining dam against the glass panel and the frame to generally preclude the exuding of sealant out of the area defined between the glass panel and the supporting frame and generally into the passenger compartment of the automobile, said anchor means normally disposed generally within said tacky bead of sealant to provide a means of anchoring said sealant retaining dam generally against sealant releasing, shifting and deformation under the influence of movement of the sealant and glass panel relative to the support frame, said sealing means including a generally longitudinally extending spacer block means integral with and depending from said anchor means, said spacer block means having a transverse dimension greater than that of a transverse dimension of said anchor means and lesser than said transverse dimension of said anchor means and lesser than said transverse dimension of said sealant retaining dam means prior to compression, said longitudinally extending spacer block means and said anchor means being notched at at least one predetermined point to provide at least one relieved area defined by said at least one notch.

9. In combination with an automotive glass panel and an adjacent but generally spaced glass panel supporting frame comprising a portion of an automotive body, a sealing means to effect a seal between the glass panel and the supporting frame comprising a sealant retaining strip means of generally self-sustaining flexible material having a longitudinally extending sealant retaining dam means normally disposed toward a passenger receiving compartment of an automobile, said dam means having a transverse dimension providing a sealing bridge across a space defined between the glass panel and its adjacent supporting frame, a generally longitudinally extending anchor means integral with and generally depending from said sealant retaining dam means whereby said anchor means is normally disposed generally within the space defined between said glass panel and said supporting frame, a longitudinally extending bead of generally tacky, generally flowable sealant formed in generally encompassing adhered relation to said anchor means, said tacky sealant bead being of sufficient transverse dimension to normally provide an effective seal between the glass panel and its associated supporting frame in their assembled relation whereby lateral forces urge the sealant retaining dam against the glass panel and the frame to generally preclude the exuding of sealant out of the area defined between the glass panel and the supporting frame and generally into the passenger compartment of the automobile, said anchor means normally disposed generally within said tacky bead of sealant to provide a means of anchoring said sealant retaining dam generally against sealant releasing, shifting and deformation under the influence of movement of the sealant and glass panel relative to the support frame, said sealant retaining dam means including longitudinally and laterally extending dam arm means, said arm means being adapted to be sealingly deflected generally downwardly and inwardly under the influence of lateral force whereby said dam arm means is maintained in sealing relation to the panel and panel supporting frame under the influence of relative movement of a panel to its supporting frame.

10. The combination of claim 9 wherein said means adapting said dam arm means to be sealingly deflected comprises providing means generally slanting said dam arm means, in their normal generally relaxed position, generally downwardly relative to a longitudinally extending plane generally normal to the surface of at least one member of the panel-frame joint.

References Cited

UNITED STATES PATENTS

| | | | |
|---|---|---|---|
| 1,975,895 | 10/1934 | Geyer | 52—399 |
| 1,988,029 | 1/1935 | Wolfe | 52—393 |
| 2,025,770 | 12/1935 | Parkinson | 52—398 |
| 2,348,297 | 5/1944 | Huddle | 52—398 |
| 2,817,881 | 12/1957 | Camp | 52—716 |
| 3,030,673 | 4/1962 | London | 52—398 X |
| 3,138,834 | 6/1964 | Shanok | 52—716 |
| 3,217,454 | 11/1965 | Leisibach | 52—398 |
| 3,241,277 | 3/1966 | Coppock | 52—208 |
| 3,167,823 | 2/1965 | Palfey | 52—398 |
| 3,388,517 | 6/1968 | Wohl | 52—403 |

JOHN E. MURTAGH, Primary Examiner

U.S. Cl. X.R.

52—397, 403